United States Patent
Kikuchi et al.

(10) Patent No.: US 9,883,336 B2
(45) Date of Patent: Jan. 30, 2018

(54) SERVER DEVICE AND INFORMATION PROCESSING SYSTEM

(71) Applicants: NTT DOCOMO, INC., Tokyo (JP); ASE Co., Ltd., Tokyo (JP)

(72) Inventors: Daisuke Kikuchi, Tokyo (JP); Daisuke Nakagawa, Tokyo (JP); Toshio Nakashima, Tokyo (JP)

(73) Assignees: NTT DOCOMO, LLC, Tokyo (JP); ASE CO., LTD., Tokyo (JP)

( * ) Notice: Subject to any disclaimer, the term of this patent is extended or adjusted under 35 U.S.C. 154(b) by 1 day.

(21) Appl. No.: 15/124,553

(22) PCT Filed: Mar. 10, 2015

(86) PCT No.: PCT/JP2015/056995
§ 371 (c)(1),
(2) Date: Sep. 8, 2016

(87) PCT Pub. No.: WO2015/137332
PCT Pub. Date: Sep. 17, 2015

(65) Prior Publication Data
US 2017/0019759 A1 Jan. 19, 2017

(30) Foreign Application Priority Data
Mar. 10, 2014 (JP) .................. 2014-046492

(51) Int. Cl.
*H04W 4/24* (2009.01)
*H04W 4/02* (2009.01)
(Continued)

(52) U.S. Cl.
CPC ............. *H04W 4/02* (2013.01); *H04W 60/00* (2013.01); *G08B 21/24* (2013.01)

(58) Field of Classification Search
CPC .................................................... H04W 60/00
See application file for complete search history.

(56) References Cited

U.S. PATENT DOCUMENTS 7,570,927 B2 * 8/2009 Correal ................... H04W 4/02
370/352
9,357,348 B2 * 5/2016 Evans ................... H04W 4/023
(Continued)

FOREIGN PATENT DOCUMENTS

JP 2004125667 A 4/2004
JP 2004265225 A 9/2004
(Continued)

OTHER PUBLICATIONS

Partial Supplementary European Search Report issued in corresponding European Application No. 15762427.1 dated Sep. 19, 2017, pp. 1-23.
(Continued)

*Primary Examiner* — Daniel Lai
*Assistant Examiner* — Frank Donado
(74) *Attorney, Agent, or Firm* — MKG, LLC

(57) ABSTRACT

A server apparatus includes: a communication unit that communicates with a first communication apparatus and a second communication apparatus; a registration unit that, upon obtaining identification data of a mobile terminal which has been lost from the first communication apparatus, registers the identification data; and an output unit that, upon obtaining position data and the identification data from the second communication apparatus, outputs the position data when the identification data is registered, the position data indicating a position of the second communication apparatus at the time when the second communication apparatus receives the identification data sent from the mobile terminal.

9 Claims, 7 Drawing Sheets

(51) Int. Cl.
*H04W 60/00* (2009.01)
*G08B 21/24* (2006.01)

(56) References Cited

U.S. PATENT DOCUMENTS

| | | | |
|---|---|---|---|
| 2012/0315902 A1* | 12/2012 | Nakahama | H04W 4/021 455/435.1 |
| 2013/0122941 A1 | 5/2013 | Das et al. | |

FOREIGN PATENT DOCUMENTS

| | | |
|---|---|---|
| JP | 2006211014 A | 8/2006 |
| JP | 2008131301 A | 6/2008 |
| JP | 2009171123 A | 7/2009 |
| JP | 2010175374 A | 8/2010 |
| JP | 2011029920 A | 2/2011 |
| JP | 2012256986 A | 12/2012 |
| JP | 2014068055 A | 4/2014 |
| WO | 2013091077 A1 | 6/2013 |
| WO | 2005016797 A1 | 2/2015 |

OTHER PUBLICATIONS

PCT International Search Report issued in International Application No. PCT/JP2015/056995, dated Jun. 2, 2015, pp. 1-2.
Notification of Reasons for Rejection issued in corresponding Japanese Patent Application No. 2016-507758, dated Sep. 6, 2016, pp. 1-5.

* cited by examiner

| IDENTIFICATION DATA | LOSS DATA | POSITION DATA | ... |
|---|---|---|---|
| ID001 | ✓ | POSITION α | ... |
| ID002 | - | - | ... |
| ID003 | - | - | ... |
| ... | ... | ... | ... |

| IDENTIFICATION DATA | LOSS DATA | POSITION DATA | POSITION DATA | ... |
|---|---|---|---|---|
| ID001 | ✓ | POSITION α | POSITION β | ... |
| ID002 | - | - | - | ... |
| ID003 | - | - | - | ... |
| ... | ... | ... | ... | ... |

SERVER DEVICE AND INFORMATION PROCESSING SYSTEM

TECHNICAL FIELD

The present invention relates to a technique to assist in searching for a lost communication device.

BACKGROUND ART

There are techniques to assist in searching for a lost mobile terminal. JP 2011-29920A describes a technique to make a mobile terminal send a connection request at a regular time interval using near-field communication when the mobile terminal determines that it has been lost. The mobile terminal notifies of being lost to another terminal that has responded to the connection request, and provides a management server with the fact that the mobile terminal has been lost and the approximate position of the mobile terminal via another terminal.

The invention of JP 2011-29920A is such that position information is transmitted to the management server and the position of the lost mobile terminal is specified when another mobile terminal responds to the connection request from the lost mobile terminal. The invention of JP 2011-29920A requires the mobile terminal to have a function of determining whether the mobile terminal is lost.

In view of this, an object of the present invention is to assist in searching for a mobile terminal even if the mobile terminal does not have a function of determining whether the mobile terminal is lost.

SUMMARY

An aspect of the present invention provides a server apparatus including: a communication unit that communicates with a first communication apparatus and a second communication apparatus; a registration unit that, upon obtaining identification data of a mobile terminal which had been lost from the first communication apparatus, registers the identification data; and an output unit that, upon obtaining position data and the identification data from the second communication apparatus, outputs the position data when the identification data is registered, the position data indicating a position of the second communication apparatus at the time when the second communication apparatus receives the identification data sent from the mobile terminal.

In a preferred aspect, the output unit further obtains, from the first communication apparatus, the identification data and position data that indicates a position of the first communication apparatus at the time when the mobile terminal gets lost, and outputs the obtained identification data and position data.

In a preferred aspect, the server apparatus further includes a calculation unit that, when a plurality of pieces of position data are registered in association with the identification data, calculates one position on the basis of the plurality of pieces of position data.

In a preferred aspect, when pieces of state data indicating states of wireless communication at times of reception of the identification data are obtained from the second communication apparatus in association with pieces of position data through multiple transactions, the calculation unit calculates the one position on the basis of positions indicated by the pieces of position data and the states of wireless communication indicated by the associated pieces of state data.

In a preferred aspect, the server apparatus further includes an obtaining unit that obtains specification data indicating specifications of hardware related to wireless communication when at least one of the first communication apparatus and the second communication apparatus performs position measurement via the wireless communication, and the calculation unit calculates the one position on the basis of the specifications indicated by the specification data. The server apparatus further includes an asking unit that, when the second communication apparatus belongs to the same region as the first communication apparatus, notifies the second communication apparatus of the identification data, and asks the second communication apparatus to transmit the identification data and position data of the second communication apparatus to the server apparatus upon reception of the identification data by the second communication apparatus.

Another aspect of the present invention provides an information processing system including a server apparatus and a first communication apparatus. The server apparatus includes: a communication unit that communicates with the first communication apparatus and a second communication apparatus; a registration unit that, upon obtaining identification data of a mobile terminal which has been lost from the first communication apparatus, registers the obtained identification data; an output unit that, upon obtaining position data and the identification data from the second communication apparatus, outputs the position data to the first communication apparatus when the obtained identification data is registered, the position data indicating a position of the second communication apparatus at the time when the second communication apparatus receives the identification data sent from the mobile terminal; and a notification unit that, in a situation where a first position indicated by position data obtained from the first communication apparatus and a second position indicated by position data received from the second communication apparatus are distant from each other by at least a predetermined distance, gives notice of the situation to the first communication apparatus. The first communication apparatus includes: a measurement unit that measures a position of the first communication apparatus; a determination unit that determines whether the mobile terminal is lost; a transmission unit that, when the mobile terminal has been lost, transmits the identification data and the position of the first communication apparatus to the server apparatus in association with each other; a setting unit that sets whether to display information received from the server apparatus; and a display unit that, when the notice is received from the server apparatus, displays the notice regardless of the setting by the setting unit.

Still another aspect of the present invention provides an information processing system including a server apparatus and a second communication apparatus. The server apparatus includes: a communication unit that communicates with a first communication apparatus and the second communication apparatus; a registration unit that, upon obtaining identification data of a mobile terminal which has been lost from the first communication apparatus, registers the obtained identification data; an output unit that, upon obtaining position data and the identification data from the second communication apparatus, outputs the position data when the obtained identification data is registered, the position data indicating a position of the second communication apparatus at the time when the second communication apparatus receives the identification data sent from the mobile terminal; and a response unit that makes a response to the second communication apparatus with respect to an inquiry request from the second communication apparatus, the response indicating whether the identification data is registered in the server apparatus. The second communication apparatus includes: a reception unit that receives the identification data sent from the mobile terminal; an inquiry unit that makes an inquiry to the server apparatus about the received identification data; a measurement unit that measures a position of the second communication apparatus; and a transmission unit that, when a response indicating that the identification data is registered is received from the server apparatus, transmits a position of the second communication apparatus at the time of reception of the identification data to the server apparatus in association with the identification data.

Still another aspect of the present invention provides an information processing system including a server apparatus and a second communication apparatus. The server apparatus includes: a communication unit that communicates with a first communication apparatus and the second communication apparatus; a registration unit that, upon obtaining identification data of a mobile terminal which has been lost from the first communication apparatus, registers the obtained identification data; an output unit that, upon obtaining position data and the identification data from the second communication apparatus, outputs the position data when the obtained identification data is registered, the position data indicating a position of the second communication apparatus at the time when the second communication apparatus receives the identification data sent from the mobile terminal; and a response unit that makes a response to the second communication apparatus with respect to an inquiry request from the second communication apparatus, the response indicating whether the identification data is registered in the server apparatus. The second communication apparatus includes: a storage unit that stores the identification data obtained from the server apparatus; a measurement unit that measures a position of the second communication apparatus; an obtaining unit that obtains the identification data from the mobile terminal; and a transmission unit that, when the obtained identification data is stored in the storage unit, transmits a position of the second communication apparatus at the time of reception of the identification data to the server apparatus in association with the identification data.

In a preferred aspect, when a position indicated by position data associated with the identification data obtained from the server apparatus belongs to the same region as the measured position of the second communication apparatus, the storage unit stores the identification data.

The present invention assists in searching for a mobile terminal even if the mobile terminal does not have a function of determining whether a mobile terminal is lost.

BRIEF DESCRIPTION OF DRAWINGS

FIGS. 9A and 9B show examples of displayed lost details.

DESCRIPTION OF EMBODIMENTS

1. First Embodiment 1-1. Overall Configuration

Figure 1:
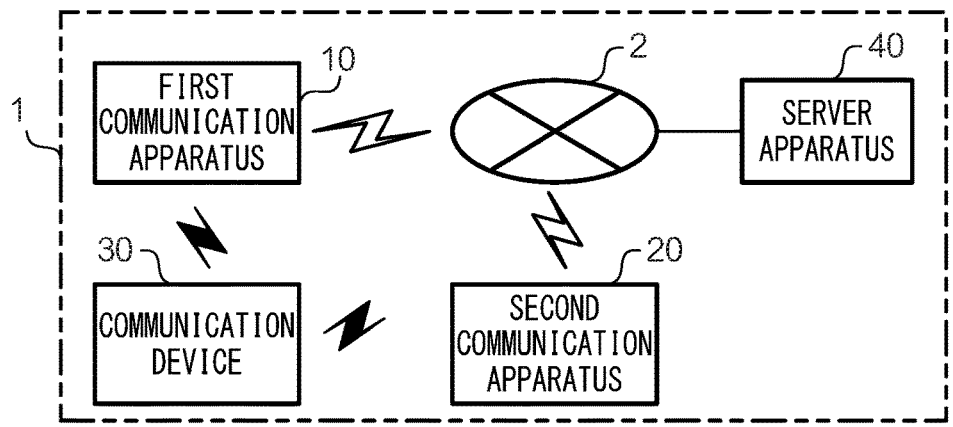
FIG. 1 shows an overall configuration of an information processing system according to a first embodiment.

FIG. 1 shows an overall configuration of information processing system 1 according to a first embodiment. Information processing system 1 includes first communication apparatus 10, second communication apparatus 20, communication device 30, server apparatus 40, and network 2. Network 2 includes a mobile communication network, the Internet, and the like, and represents a system for mediating data exchange between apparatuses. Network 2 is connected to first communication apparatus 10, second communication apparatus 20, and server apparatus 40 that exchange data with one another.

First communication apparatus 10 and second communication apparatus 20 are used in a search for communication device 30, and perform wireless communication. These communication apparatuses are, for example, smartphones or tablet terminals. In the present embodiment, these communication apparatuses not only perform mobile communication via network 2, but also perform Bluetooth (registered trademark) communication (hereinafter also referral to as "BT communication"). In the following description, it will be assumed that first communication apparatus 10 is used by user A, whereas second communication apparatus 20 is used by user B.

Communication device 30 is a terminal to be searched for, and has a wireless communication function. In the present embodiment, communication device 30 has a function of performing BT communication, and performs BT communication with first communication apparatus 10 and second communication apparatus 20 present within a predetermined range. Communication device 30 is, for example, an eyeglass- or wristwatch-type wearable terminal, and carried by a user.

Communication device 30 executes processing in accordance with its intended use, and exchanges data related to the processing via BT communication (note that it may only transmit or receive the data). The present embodiment describes a case in which communication device 30 is a wristwatch-type wearable terminal used by user A. Specifically, communication device 30 has a function of counting the number of steps, and transmits data indicating the counted number of steps to first communication apparatus 10 used by user A.

When user A has lost communication device 30, server apparatus 40 provides user A with information related to lost communication device 30 (hereinafter referral to as "lost details"). Server apparatus 40 provides, for example, the position of communication device 30 which has been lost and other information that can be used in a search for the communication device as the lost details. Information processing system 1 provides a service of assisting in the search for lost communication device 30 by providing user A with the lost details. Both user A and user B have joined this service.

1-2. Hardware Configurations

Figure 2:
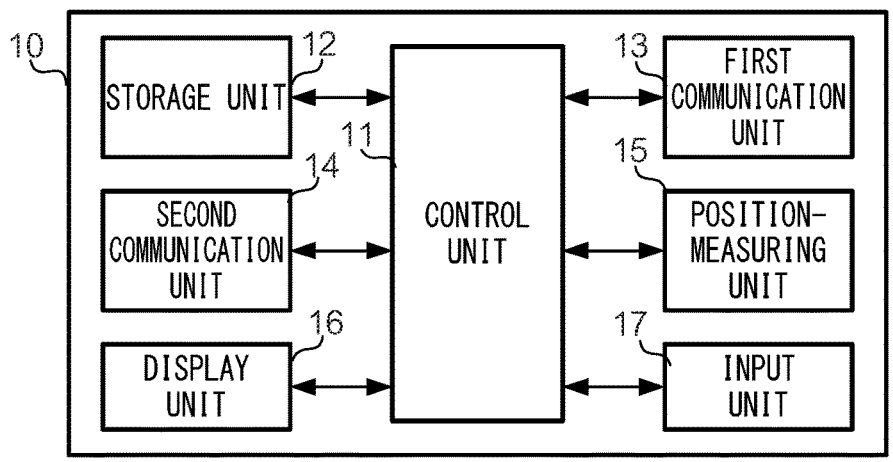
FIG. 2 shows a hardware configuration of a first communication apparatus.¥

FIG. 2 shows a hardware configuration of first communication apparatus 10. First communication apparatus 10 is a computer including control unit 11, storage unit 12, first communication unit 13, second communication unit 14, position-measuring unit 15, display unit 16, and input unit 17. Control unit 11 includes a processor, such as a central processing unit (CPU), a read-only memory (ROM), a random-access memory (RAM), and a real-time clock. Using the RAM as a working area, the CPU executes programs stored in the ROM and storage unit 12. The real-time clock has a function of calculating the current date and time. Storage unit 12 includes a flash memory and the like, and stores, for example, data and programs used by control unit 11 for control.

First communication unit 13 includes a communication circuit for performing mobile communication, and performs communication via network 2. Second communication unit 14 has a communication circuit for performing BT communication, and performs BT communication with communication device 30, for example. Second communication unit 14 also generates data indicating the reception strength of radio waves in BT communication, and feeds the generated data to control unit 11. Position-measuring unit 15 measures the position of first communication apparatus 10 using, for example, technology of a global positioning system (GPS). Position-measuring unit 15 feeds position data indicating the measured position to control unit 11. Display unit 16 includes, for example, a liquid crystal display, and displays images under control by control unit 11. Input unit 17 includes input means, such as a touch sensor and buttons, receives a user operation, and feeds operation data indicating the substance of the user operation to control unit 11. Control unit 11 executes processing in accordance with the fed operation data.

Figure 3:
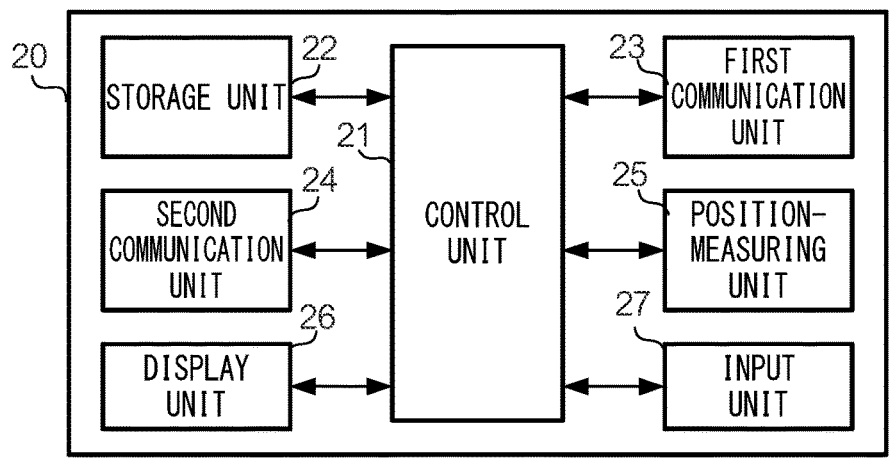
FIG. 3 shows a hardware configuration of a second communication apparatus.

FIG. 3 shows a hardware configuration of second communication apparatus 20. Second communication apparatus 20 is a computer including control unit 21, storage unit 22, first communication unit 23, second communication unit 24, position-measuring unit 25, display unit 26, and input unit 27. These units are each configured in the same way as the unit of the same name shown in FIG. 2.

Figure 4:
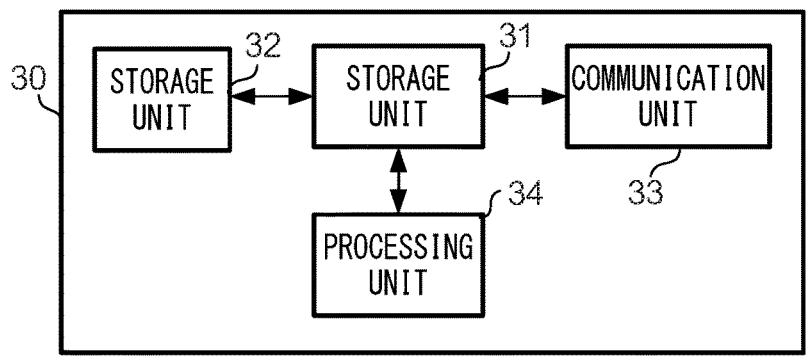
FIG. 4 shows a hardware configuration of a communication device.

FIG. 4 shows a hardware configuration of communication device 30. Communication device 30 includes control unit 31, storage unit 32, communication unit 33, and processing unit 34. Control unit 31 and storage unit 32 are each configured in the same way as the unit of the same name shown in FIG. 2. Communication unit 33 includes a communication circuit for performing BT communication, and performs BT communication with first communication apparatus 10 and second communication apparatus 20. Processing unit 34 executes processing unique to communication device 30. In the present embodiment, processing unit 34 executes processing for counting the aforementioned number of steps, and processing for transmitting data indicating the counted number of steps via BT communication.

Figure 5:
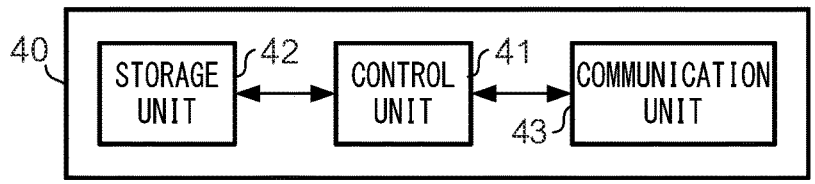
FIG. 5 shows a hardware configuration of a server apparatus.

FIG. 5 shows a hardware configuration of server apparatus 40. Server apparatus 40 includes control unit 41, storage unit 42, and communication unit 43. Control unit 41 is realized by a processor. Storage unit 42 is a storage apparatus, such as a hard disk and a semiconductor memory, and stores, for example, data and programs used by control unit 41 for control. Communication unit 43 includes a communication circuit for performing wired or wireless communication, and performs communication via network 2.

With the aforementioned hardware configurations, information processing system 1 executes provision processing for providing user A with the lost details.

1-3. Functional Configurations

The storage units of the apparatuses/devices included in information processing system 1 store programs for executing the provision processing. The control units of the apparatuses/devices control hardware of their respective apparatuses/devices through the execution of these programs to realize the following functions.

Figure 6:
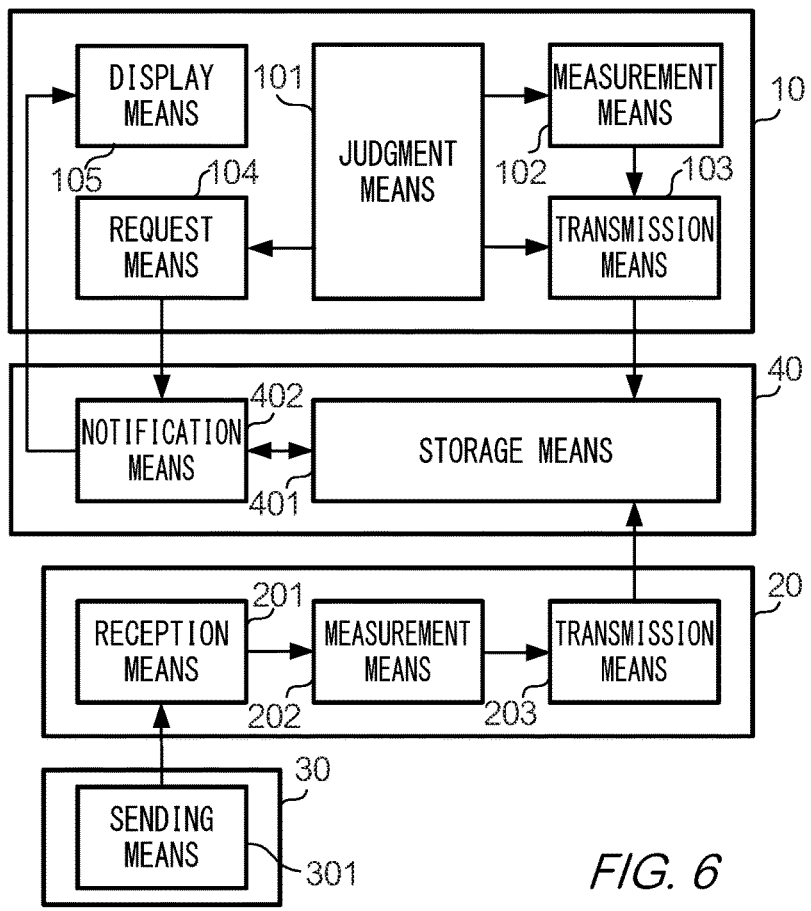
FIG. 6 shows an example of functional configurations realized by the apparatuses/devices included in the information processing system.

FIG. 6 shows an example of functional configurations realized by the apparatuses/devices included in information processing system 1. First communication apparatus 10 includes determination means 101, measurement means 102, transmission means 103, request means 104, and display means 105. Second communication apparatus 20 includes reception means 201, measurement means 202, and transmission means 203. Communication device 30 includes sending means 301. Server apparatus 40 includes storage means 401 and notification means 402.

1-3-1. Sending Means

Sending means 301 of communication device 30 sends identification data for identifying communication device 30. Examples of the identification data include a manufacturing number, a serial number, and a product type of communication device 30. Sending means 301 stores the identification data. It reads out the identification data at a predetermined time interval (e.g., every second or every minute), and sends the identification data as a part of communication start data used to start BT communication, for example.

When first communication apparatus 10 is present within a range of the aforementioned BT communication, first communication apparatus 10 receives the communication start data sent from sending means 301, and BT communication with communication device 30 is started using the communication start data. Thereafter, while first communication apparatus 10 is present within the BT communication range, or until a user operates first communication apparatus 10 to end BT communication, communication device 30 executes processing in accordance with the intended use (in the present embodiment, processing for counting the number of steps and processing for transmitting data indicating the number of steps) through exchange of data related to the intended use via BT communication.

Communication device 30 operates on electric power supplied from an electric power source, such as a battery, that can supply electric power for a certain time period (e.g., approximately one or two years). Sending means 301 keeps sending the identification data during that time period. Assume that communication device 30 has been lost as it has been left behind or dropped by user A. In this case, sending means 301 keeps sending the identification data as long as the supply of electric power from the electric power source lasts.

1-3-2. Determination Means

Determination means 101 of first communication apparatus 10 determines whether communication device 30 is in a lost state. The lost state means a state in which user A has lost communication device 30. In the present embodiment, determination means 101 determines that communication device 30 has been lost when the following state has lasted at least a preset time period (e.g., five minutes): BT communication is not performed with communication device 30 and the communication start data sent from sending means 301 of communication device 30 is not received. Upon judging that communication device 30 has been lost, determination means 101 feeds judgment data indicating a result of the determination to measurement means 102 and request means 104.

1-3-3. Measurement Means

Measurement means 102 of first communication apparatus 10 measures the position of first communication apparatus 10. In the present embodiment, measurement means 102 measures the position of first communication apparatus 10 when the judgment data is fed from determination means 101, that is, when determination means 101 determines that communication device 30 has been lost. The measured position is the position of first communication apparatus 10 at the time when determination means 101 determines that communication device 30 has been lost. In other words, the measured position is the position of first communication apparatus 10 at the time when communication device 30 enters the lost state. Measurement means 102 feeds position data indicating the measured position to transmission means 103.

1-3-4. Transmission Means

Transmission means 103 of first communication apparatus 10 transmits the identification data of communication device 30 to server apparatus 40 when determination means 101 determines that communication device 30 has been lost, that is, when communication device 30 enters the lost state. Specifically, transmission means 103 transmits the position data fed from measurement means 102 and the identification data to server apparatus 40 in association with each other. Note that the position data indicates the position of first communication apparatus 10 measured by measurement means 102 at the time when determination means 101 made the determination.

Transmission means 103 stores the identification data contained in the communication start data received when starting BT communication with communication device 30, for example. Transmission means 103 also stores destinations, such as an internet protocol (IP) address of server apparatus 40, in advance. When the position data is fed from measurement means 102, transmission means 103 reads out the identification data, and transmits the identification data to server apparatus 40 together with the fed position data. Server apparatus 40 associates the received pieces of data with each other. Note that methods used by transmission means 103 to associate the pieces of data with each other include, for example, inserting a common code into headers of the pieces of data, or inserting information (e.g., a file name) of one piece of data into a header of the other piece of data.

1-3-5. Reception Means

Reception means 201 of second communication apparatus 20 receives the identification data sent from communication device 30. Reception means 201 receives the identification data from communication device 30 when second communication apparatus 20 is present within the BT communication range of communication device 30. Reception means 201 feeds the received identification data to measurement means 202.

1-3-6. Measurement Means

Measurement means 202 of second communication apparatus 20 measures the position of second communication apparatus 20. In the present embodiment, measurement means 202 measures the position of second communication apparatus 20 when the identification data is fed from reception means 201, that is, when reception means 201 receives the identification data from communication device 30. Position data of the measured position indicates the position of second communication apparatus 20 at the time of reception of the identification data sent from communication device 30. Measurement means 202 feeds the position data indicating the measured position and the fed identification data to transmission means 203.

1-3-7. Transmission Means

Transmission means 203 of second communication apparatus 20 transmits the position data and the identification data fed from measurement means 202 to server apparatus 40 in association with each other. Note that the position data indicates the position of second communication apparatus 20 measured by measurement means 202 at the time of reception of the identification data. For example, transmission means 203 stores destinations, such as the IP address of server apparatus 40, in advance. It associates the position data and the identification data fed from measurement means 202 with each other using any of the methods described earlier in relation to transmission means 103, and transmits them to server apparatus 40.

1-3-8. Storage Means

When storage means 401 of server apparatus 40 obtains, from first communication apparatus 10, the identification data for identifying communication device 30 which has been lost, storage means 401 stores the identification data in association with loss data indicating that communication device 30 which has been lost. The loss data is, for example, a flag indicating whether the loss has occurred. When storage means 401 obtains, from first communication apparatus 10, the identification data and the position data indicating the position of first communication apparatus 10 at the time when communication device 30 gets lost, it stores the identification data and the position data in association with each other.

Server apparatus 40 stores a loss management database (DB) that stores the preregistered identification data of communication device 30. The loss management DB stores the loss data and the position data in association with each other. The loss management DB is used to manage information of communication devices which has been lost.

Figures 7, 8, 9:
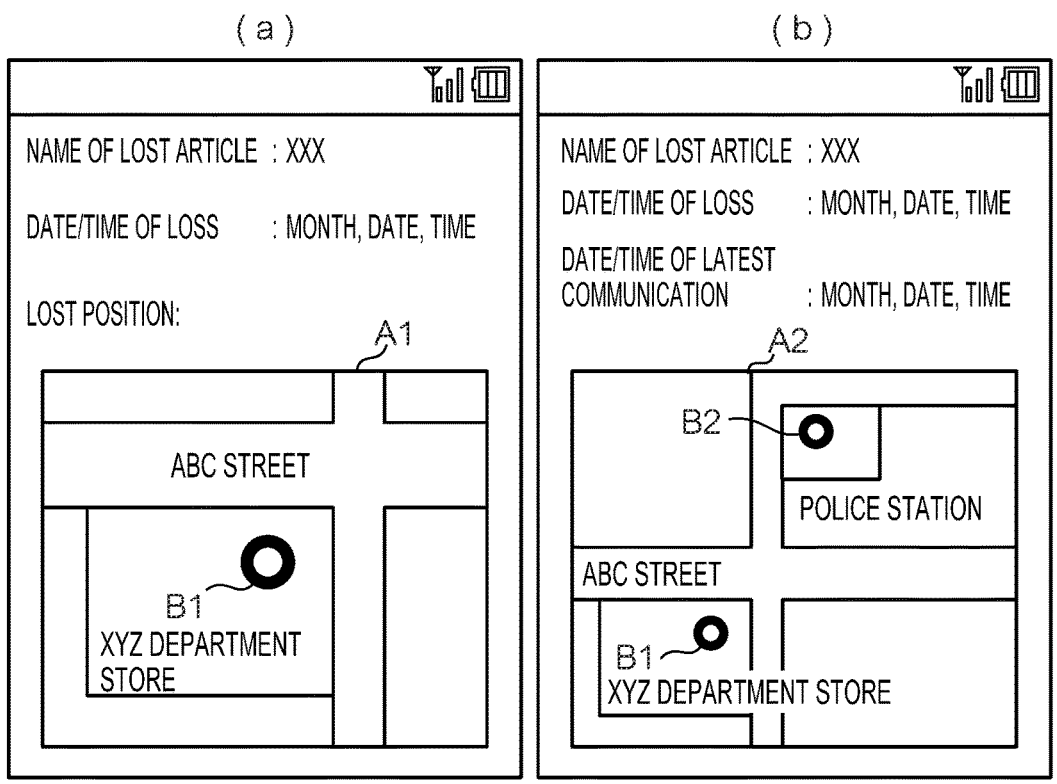
FIG. 7 shows an example of a loss management DB.
FIG. 8 shows another example of the loss management DB.

FIG. 7 shows an example of the loss management DB. In FIG. 7, pieces of identification data indicating "ID001," "ID002," and "ID003" are illustrated as examples of registered identification data.

In this example, storage means 401 stores the following in the loss management DB in association with identification data indicating "ID001": loss data represented by a flag indicating whether the loss has occurred, and position data indicating "position α." On the other hand, it does not store any loss data and position data in association with "ID002" and "ID003." This situation indicates that first communication apparatus 10 has determined that communication device 30 identified by "ID001" has been lost, and "position α" was measured as the position at the time of making that determination.

When storage means 401 receives, from second communication apparatus 20, the identification data sent from communication device 30 and the position data indicating the position of second communication apparatus 20 at the time of reception of the identification data, it stores the received position data in association with the identification data if the identification data has been stored in association with the loss data.

FIG. 8 shows another example of the loss management DB. In FIG. 8, the loss management DB of storage means 401 stores position data indicating "position β" which has been transmitted from second communication apparatus 20, in association with the identification data indicating "ID001." In this way, storage means 401 stores the position data from second communication apparatus 20 in the loss management DB in association with the identification data. This example indicates that second communication apparatus 20 passed through the BT communication range of communication device 30 identified by "ID001," and "position β" was measured as the position of second communication apparatus 20 at the time of passage.

In the example of FIG. 8, each time second communication apparatus 20 passes through the BT communication range of communication device 30 identified by "ID001," the number of pieces of position data stored in association with "ID001" increases (when there are a plurality of second communication apparatuses 20, passing second communication apparatus 20 may be any of different second communication apparatuses 20, or the same second communication apparatus 20). Storage means 401 stores pieces of position data in such a manner that they are arranged in the order they were received, thereby presenting the order of measurements of positions indicated by the pieces of position data. Storage means 401 may associate date/time data indicating the date and time of storage of position data with the position data to present the date and time of position measurement. The date/time data may be generated when first communication apparatus 10 or second communication apparatus 20 measures a position, and associated with position data indicating the measured position.

1-3-9. Request Means

Request means 104 of first communication apparatus 10 requests server apparatus 40 for the lost details related to communication device 30 that has been determined by determination means 101 to be lost. The lost details contains, for example, the position(s) indicated by position data stored in storage means 401. When storage means 401 stores date/time data, the lost details also contains the date(s) and time(s) indicated by the date/time data. That is, the lost details is represented by data stored in association with identification data stored in storage means 401.

For example, request means 104 stores the identification data of communication device 30, similarly to transmission means 103. When the judgment data is fed from determination means 101, request means 104 transmits, to server apparatus 40, request data representing a request for transmission of data associated with the stored identification data, that is, transmission of the aforementioned data representing the lost details, either at predetermined time (e.g., at 0 o'clock every day) or upon a user operation at or after the feeding.

1-3-10. Notification Means

Notification means 402 of server apparatus 40 notifies a user of the lost details requested by first communication apparatus 10 via first communication apparatus 10. Upon receiving the request data from first communication apparatus 10, notification means 402 refers to storage means 401 and reads out data associated with the identification data indicated by the request data (e.g., position data, together with date/time data if stored). Notification means 402 transmits the read data and the identification data that was used in the reading to first communication apparatus 10 in association with each other. These pieces of data compose the lost details, which is to be displayed by first communication apparatus 10 to notify a user of the same as will be described later. As such, notification means 402 transmits data representing the lost details to notify a user of the lost details.

1-3-11. Display Means

Display means 105 of first communication apparatus 10 displays the lost details represented by the data transmitted from server apparatus 40. When display means 105 receives, for example, the identification data and position data from server apparatus 40, it displays, for example, a character string denoting communication device 30 indicated by the identification data, and a character string and an image denoting the position indicated by the position data. When display means 105 further receives date/time data, it also displays, for example, a character string denoting the date and time indicated by the date/time data.

FIGS. 9A and 9B show examples of the displayed lost details. In FIG. 9A, display unit 26 of first communication apparatus 10 displays "name of lost article: XXX" as a character string denoting communication device 30, and "date/time of loss: month, date, time" as a character string indicated by the date/time data. For example, display means 105 stores a product name contained in the communication start data sent from communication device 30 when starting BT communication, and displays the product name as a name of a lost article. Display means 105 displays the date and time when "position α" shown in FIG. 7 was measured as the date and time of loss.

Furthermore, in FIG. 9A, position image B1 indicating "position α" is displayed over map A1. Display means 105 stores map data, and displays map A1 using the map data. Display means 105 may display a map using map data provided over the Internet and the like. Notifying user A of the lost details shown in FIG. 9A allows user A to learn the approximate position where communication device 30 was lost, and search for communication device 30 by going to the site or making an inquiry at a store and the like encompassing the position.

In FIG. 9B, "date/time of loss: month, date, time" and "date/time of latest communication: month, date, time" are displayed as character strings denoting the dates and times when two positions "position α" and "position β" shown in FIG. 8 were measured. Furthermore, position image B1 indicating "position α" and position image B2 indicating "position β" are displayed over map A2. Notifying user A of the lost details shown in FIG. 9B allows user A to learn the fact that communication device 30 has been transported and the position to which it has been transported.

1-3-12. When Communication Device is Found

When user A finds communication device 30 with reference to the lost details of which he/she has been notified, the communication start data sent from sending means 301 is received again, and determination means 101 accordingly determines that communication device 30 is not lost. When determination means 101 thus determines that communication device 30 is not lost, it feeds judgment data indicating the judgment result to transmission means 103 together with the identification data. Transmission means 103 transmits the fed judgment data and identification data to server apparatus 40 in association with each other. When storage means 401 receives the judgment data indicating the judgment result, i.e., indicating that communication device 30 is not lost, it deletes the loss data and position data stored in association with the identification data that has been received in association with the judgment data.

1-4. Operations

With the foregoing configurations, information processing system 1 executes the aforementioned provision processing. A description is now given of the operations performed by the apparatuses/devices included in information processing system 1 in the provision processing.

Figure 10:
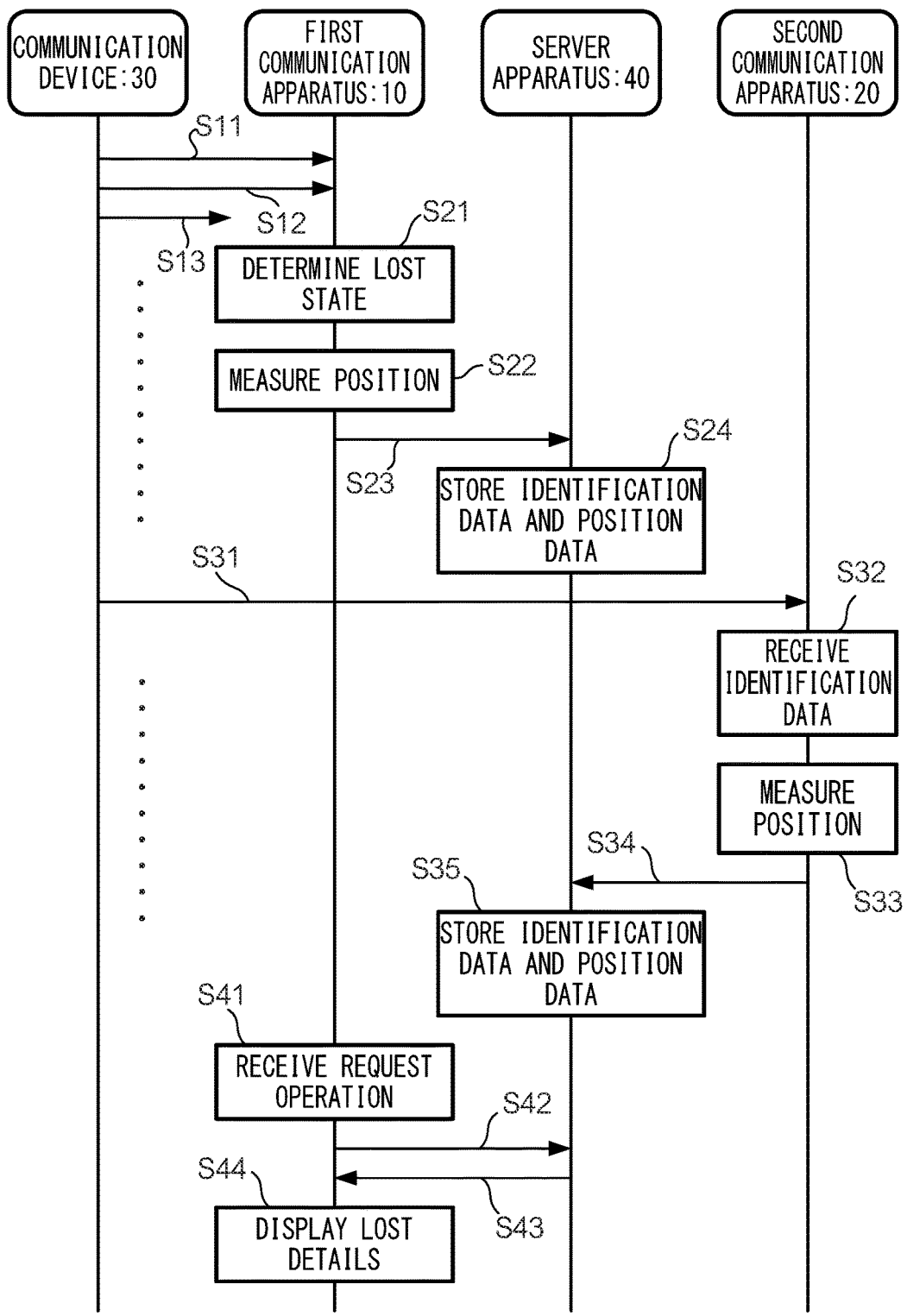
FIG. 10 is a sequence diagram showing examples of the operations performed by the apparatuses/devices in provision processing.

FIG. 10 is a sequence diagram showing examples of the operations performed by the apparatuses/devices in the provision processing. Steps S11, S12, S13, and so on shown in FIG. 10 represent the operations of communication device 30 that sends the communication start data for BT communication containing the identification data at the predetermined time interval. These steps are operations performed by sending means 301. In this example, in steps S11 and S12, first communication apparatus 10 is present within the BT communication range of communication device 30 and receives the sent communication start data.

On the other hand, in step S13, first communication apparatus 10 is outside the BT communication range of communication device 30, and hence outside the reach of the sent communication start data. When a threshold time period has elapsed without receiving the communication start data, first communication apparatus 10 determines that communication device 30 has been lost (step S21). Then, first communication apparatus 10 measures the position thereof (step S22), and transmits position data indicating the measured position and the identification data of communication device 30 to server apparatus 40 (step S23). Server apparatus 40 stores the position data in association with the received identification data (step S24). Steps S21, S22, and S23 are operations performed by determination means 101, measurement means 102, and transmission means 103, respectively. Step S24 is an operation performed by storage means 401.

In the example of FIG. 10, when communication device 30 sends the communication start data in step S31, second communication apparatus 20 is present within the BT communication range of communication device 30 and receives the communication start data (step S32). As second communication apparatus 20 has received the communication start data, it measures the position thereof (step S33), and transmits position data indicating the measured position to server apparatus 40 in association with the identification data contained in the communication start data (step S34). Server apparatus 40 stores the received identification data and position data in association with each other (step S35). Steps S32, S33, and S34 are operations performed by reception means 201, measurement means 202, and transmission means 203, respectively. Step S35 is an operation performed by storage means 401.

Thereafter, for example, when user A performs an operation to request the lost details on communication device 30, first communication apparatus 10 receives the operation (step S41) and transmits request data to server apparatus 40 (step S42). Server apparatus 40 transmits data composing the requested lost details (e.g., position data and date/time data) to first communication apparatus 10 (step S43), and first communication apparatus 10 displays the lost information represented by the received data (step S44). Steps S41 and S42 are operations performed by request means 104.

Steps S43 and S44 are operations performed by notification means 402 and display means 105, respectively.

1-5. Effects of Embodiment

In the present embodiment, the position measured when communication device 30 is determined to be lost by first communication apparatus 10 is provided to user A as the lost details. As the lost details allows user A to learn the approximate position where communication device 30 was lost, the possibility of finding communication device 30 can be increased compared to a case in which communication device 30 is searched for without using the lost details containing the position measured by first communication apparatus 10.

Furthermore, in the present embodiment, the position measured by second communication apparatus 20 that approached communication device 30 to be within the BT communication range of communication device 30 is also provided to user A as the lost details. As a result, should communication device 30 be transported, the position to which it has been transported can be learned as shown in the example of FIG. 9B. This can increase the possibility of finding communication device 30. Moreover, in information processing system 1, communication device 30 simply sends the identification data repeatedly, and need not perform the operations performed by first communication apparatus 10, including determination as to whether communication device 30 is lost. The foregoing present embodiment makes it easy to find a lost communication device even if the lost communication device does not determine whether to be lost, for example.

2. Second Embodiment

The following describes a second embodiment of the present invention with a focus on differences from the first embodiment. In the first embodiment, measurement means 202 measures the position of a second communication apparatus when reception means 201 of the second communication apparatus receives identification data. In the second embodiment, measurement means 202 performs position measurement only when communication device 30 identified by the identification data has been lost.

2-1. Functional Configurations

Figure 11:
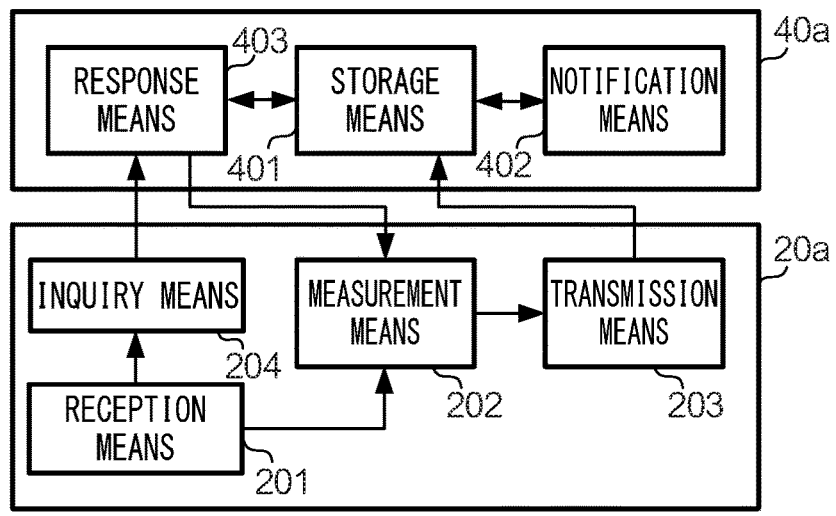
FIG. 11 shows an example of functional configurations of a second communication apparatus and a server apparatus according to a second embodiment.

FIG. 11 shows an example of functional configurations of a second communication apparatus and a server apparatus according to the second embodiment FIG. 11 shows second communication apparatus 20a and server apparatus 40a that include inquiry means 204 and response means 403, respectively, in addition to the means shown in FIG. 6. Reception means 201 of second communication apparatus 20a according to the present modification example feeds received identification data to inquiry means 204.

Upon receiving the identification data from reception means 201, inquiry means 204 makes an inquiry to server apparatus 40a about whether the identification data is stored in association with loss data. Specifically, when the identification data is fed from reception means 201, inquiry means 204 transmits inquiry data representing the aforementioned inquiry about the identification data to server apparatus 40a.

When the identification data about which second communication apparatus 20a has inquired is stored in storage means 401 of server apparatus 40a in association with loss data, response means 403 responds to second communication apparatus 20a to that effect. Specifically, upon receiving the inquiry data, response means 403 refers to identification data stored in storage means 401, and if loss data is stored in association with the identification data indicated by the inquiry data, transmits response data to that effect to second communication apparatus 20a.

Measurement means 202 of second communication apparatus 20a measures the position of second communication apparatus 20a when server apparatus 40a responds to the aforementioned inquiry. Specifically, measurement means 202 measures the position when the response data transmitted from server apparatus 40a is received. Transmission means 203 of second communication apparatus 20a transmits position data indicating the position measured when the foregoing response was made, and the identification data associated with the inquiry to which the response was made, to server apparatus 40a in association with each other. Storage means 401 stores the position data associated with the identification data in association with the identification data.

The second communication apparatus may not only receive the identification data from communication device 30 is lost, but also receive the identification data from communication device 30 that is not is lost. In the latter case, although the second communication apparatus measures a position and transmits the position data and the identification data to the server apparatus, the server apparatus discards both pieces of data as it does not store loss data in association with the identification data. That is, in this case, the position data indicating the measured position is not stored, and thus goes to waste. In the present embodiment, a position is measured only when a response is made to the inquiry about the lost state. That is, a position is measured after confirming that communication device 30 from which the identification data was received has been lost. This enables position data indicating the position measured by the second communication apparatus to be stored in the server apparatus without fail. In other words, the second communication apparatus can be prevented from wastefully measuring a position in a case where position data may not be stored to the server apparatus.

3. Third Embodiment

The following describes a third embodiment of the present invention with a focus on differences from the first and second embodiments. In the second embodiment, a second communication apparatus makes an inquiry to a server apparatus to make a determination about the lost state. In the third embodiment, a second communication apparatus obtains and stores data stored in a server apparatus in advance, and makes a determination about the lost state on the basis of the stored data.

3-1. Functional Configurations

Figure 12:
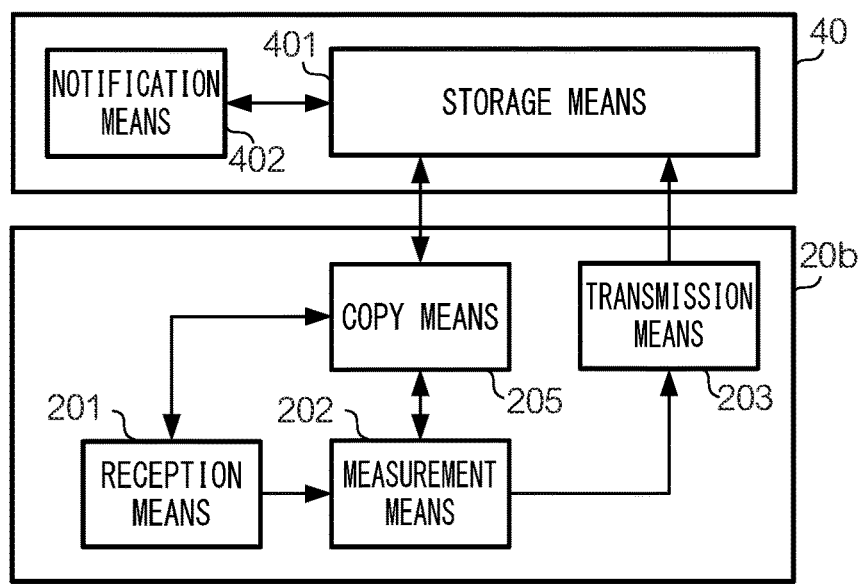
FIG. 12 shows an example of functional configurations of a second communication apparatus and a server apparatus according to a third embodiment.

FIG. 12 shows an example of functional configurations of a second communication apparatus and a server apparatus according to the third embodiment. FIG. 12 shows second communication apparatus 20b that includes copy means 205 in addition to the means shown in FIG. 6, as well as server apparatus 40. Copy means 205 makes a copy of data stored in storage means 401 of server apparatus 40, and stores the copy. It is sufficient to make a copy of data using known replication technology. Copy means 205 may make a copy of all or a part of identification data and data associated therewith stored in storage means 401.

The following describes an example in which copy means 205 makes a copy of identification data stored in association with loss data, and stores the copy. This copy method is referred to as a "first copy method." With the first copy method, although copy means 205 does not make a copy of loss data, any identification data stored in copy means 205 represents data associated with loss data. Copy means 205 makes a copy of data at, for example, a predetermined time interval (e.g., every day or every week).

When reception means 201 receives identification data from a communication device, measurement means 202 measures the position of second communication apparatus 20b if copy means 205 of second communication apparatus 20b stores the identification data as data associated with loss data. In a case where a copy has been made using the first copy method, measurement means 202 refers to copy means 205 when the identification data is fed from reception means 201, and measures the position of second communication apparatus 20b if the fed identification data is stored.

In the present embodiment, the second communication apparatus measures the position only when the identification data of communication device 30 is lost is received. Therefore, similarly to the second embodiment, the second communication apparatus can be prevented from performing wasteful position measurement. Furthermore, in the present embodiment, the lost state is confirmed using identification data stored in the second communication apparatus. Therefore, the lost state can be confirmed quickly and position measurement can be performed quickly compared to a case in which identification data stored in the server apparatus or a similar external apparatus is used. If position measurement is delayed, the second communication apparatus may move away from communication device 30 during the delay. However, in the present embodiment, position measurement is performed quickly as stated earlier, and thus the position measured by the second communication apparatus is likely to be closer to communication device 30. This can increase the possibility of a user finding communication device 30.

3-2. Another Copy Method

Copy means 205 may make a copy of data using a second copy method different from the first copy method. With the second copy method, copy means 205 makes a copy of identification data stored in storage means 401 in association with position data indicating a position included in the same region as the position measured by measurement means 202, and stores the copy. This region is a region in which the second communication apparatus is normally present, and there is a high possibility that user B is engaged in activities in this region. Hereinafter, this region is referred to as an "active region." For example, copy means 205 uses a prefecture, a municipality, or a similar district including the measured position as the active region. Copy means 205 may use a quadrilateral region that includes all measured positions and is enclosed by lines of latitude and longitude as the active region, or may use a circular region that includes all measured positions as the active region.

As described in the first embodiment, storage means 401 stores position data when communication device 30 has been lost, and deletes the position data when communication device 30 is no longer is lost; therefore, identification data associated with position data is also associated with loss data. That is, every identification data copied and stored by copy means 205 using the second copy method identifies communication device 30 is lost. It is hence sufficient for measurement means 202 to perform measurement similarly to the case of the first copy method.

The second copy method limits the copy targets (identification data to be copied) in accordance with the aforementioned active region. For example, when measurement means 202 is limited to measuring a position within Tokyo Metropolis (the active region in the present case), copy means 205 makes a copy of identification data associated with position data indicating a position within Tokyo Metropolis, and stores the copy. This can reduce the amount of identification data (both the number of pieces of identification data and a total size thereof) stored in the second communication apparatus compared to a case in which the copy targets are not limited in accordance with a position.

The second copy method could give rise to the following problem: for example, when the second communication apparatus receives identification data from communication device 30 outside the active region, it is determined that communication device 30 is not is lost because copy means 205 has not made a copy of the identification data of communication device 30, and hence position measurement is not performed. In view of this, it is preferable that the active region be as large as possible, instead of barely including a measured position. A region in which measurement means 202 has not performed measurement may be included within the active region by a user operation. In this case, the aforementioned problem would not be likely to occur if a user registers regions where he/she may visit in advance.

4. Fourth Embodiment

The following describes a fourth embodiment of the present invention with a focus on differences from the aforementioned embodiments. In the aforementioned embodiments, a measured position is provided as-is as lost details. In the fourth embodiment, when a plurality of positions have been measured, a position calculated on the basis of such positions is provided as lost details.

4-1. Functional Configuration

Figure 13:
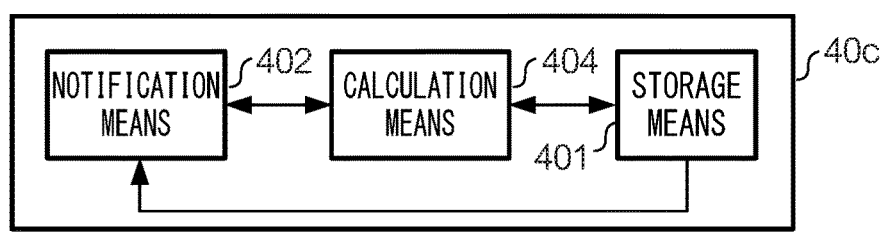
FIG. 13 shows an example of a functional configuration of a server apparatus according to a fourth embodiment.

FIG. 13 shows an example of a functional configuration of a server apparatus according to the fourth embodiment FIG. 13 shows server apparatus 40c that includes calculation means 404 in addition to the means shown in FIG. 6. When storage means 401 of server apparatus 40c stores a plurality of pieces of position data in association with identification data, calculation means 404 calculates one position on the basis of the positions indicated by the plurality of pieces of position data.

For example, calculation means 404 refers to storage means 401 upon storage of position data to storage means 401 in association with identification data, and if a plurality of pieces of position data are associated with the identification data, reads out the plurality of pieces of position data. The plurality of pieces of position data contain position data indicating the position measured by a first communication apparatus and position data indicating the position measured by a second communication apparatus. Calculation means 404 averages the longitudes and latitudes of the positions indicated by the plurality of pieces of position data that have been read out to calculate one position defined by the obtained average longitude and latitude. Calculation means 404 feeds calculated position data to storage means 401.

Storage means 401 stores the calculated position data that has been fed in association with the identification data associated with the plurality of pieces of position data. For example, notification means 402 transmits the calculated position data, instead of or together with the plurality of pieces of position data, as data associated with the identification data indicated by a request from first communication apparatus 10. For example, even if communication device 30 stays for a long time in a place where it was lost, the positions measured by the first and second communication apparatuses may show variations, e.g., fall within a BT range or may be slightly outside the BT range. Furthermore, the positions measured by the communication apparatuses per se have errors. As the number of measured positions increases, these variations and errors are offset by, for example, averaging the measured positions in the aforementioned manner, and the obtained average is likely to be the actual position of communication device 30. In the present embodiment, as one position is calculated from a plurality of positions, a position with higher precision can be provided as lost details.

Calculation means 404 is not limited to obtaining an average, and may obtain, for example, a median or a weighted average. Calculation means 404 may exclude a position that is distant from an average by at least a predetermined distance (e.g., 10 m, 50 m, or a distance across which communication device 30 can perform BT communication) as an abnormal value or an outlier, and obtain an average again without using the excluded position. The predetermined distance may have a value corresponding to dispersion of positions (the larger the dispersion, the larger the value of the predetermined distance). As such, calculation means 404 may calculate one position using various methods. It is preferable to, for example, carry out an experiment in which the second communication apparatus performs position measurement while the position of communication device 30 is known, to find and use a method of calculating a position that is as close as possible to the actual position of communication device 30.

4-2. Calculation in Consideration of State of Wireless Communication

Calculation means 404 may calculate one position in consideration of the state of wireless communication at the time of position measurement by measurement means (102 and 202) of the first and second communication apparatuses. The following describes a case in which such measurement means perform position measurement using wireless communication, such as BT communication and communication via a local area network (LAN), in addition to the aforementioned GPS technology. This measurement method is used in a place where many wireless communication apparatuses that perform wireless communication are situated. These wireless communication apparatuses repeatedly send communication start data for starting communication, as in the aforementioned BT communication. The communication start data contains data indicating the position of a wireless communication apparatus that sends it. Hereinafter, such data is referral to as "apparatus position data."

Upon receiving the communication start data, the measurement means of each of the first and second communication apparatuses calculates the position of the apparatus on the basis of the reception strength, the apparatus position indicated by the apparatus position data contained in the received communication start data, and the position measured using GPS (hereinafter referral to as a "GPS position"). For example, when there is one apparatus position, measurement means 202 calculates, as the position of the second communication apparatus, a position that is closest to the GPS position among positions on a circumference centered at the apparatus position and has a radius equal to a distance obtained from the reception strength. When there are two or more apparatus positions, measurement means 202 measures, as the position of the second communication apparatus, a position that is closest to the GPS position within a region in which circles that are centered at the apparatus positions and have radii equal to distances obtained from the reception strengths overlap. Hereinafter, a position that has been measured is referred to as a "measured position."

The transmission means of each of the first and second communication apparatuses transmits state data indicating the state of wireless communication of the apparatus at the time when the measurement means of the apparatuses measured the position, that is, at the time of reception of identification data, and position data indicating the position to server apparatus 40c in association with each other. The state of wireless communication of the apparatus is defined by, for example, the apparatus positions indicated by the apparatus position data contained in the communication start data received by the apparatus, that is, the positions of all wireless communication apparatuses that can perform wireless communication with the apparatus. A specific example will now be described with reference to FIG. 14.

Figure 14:
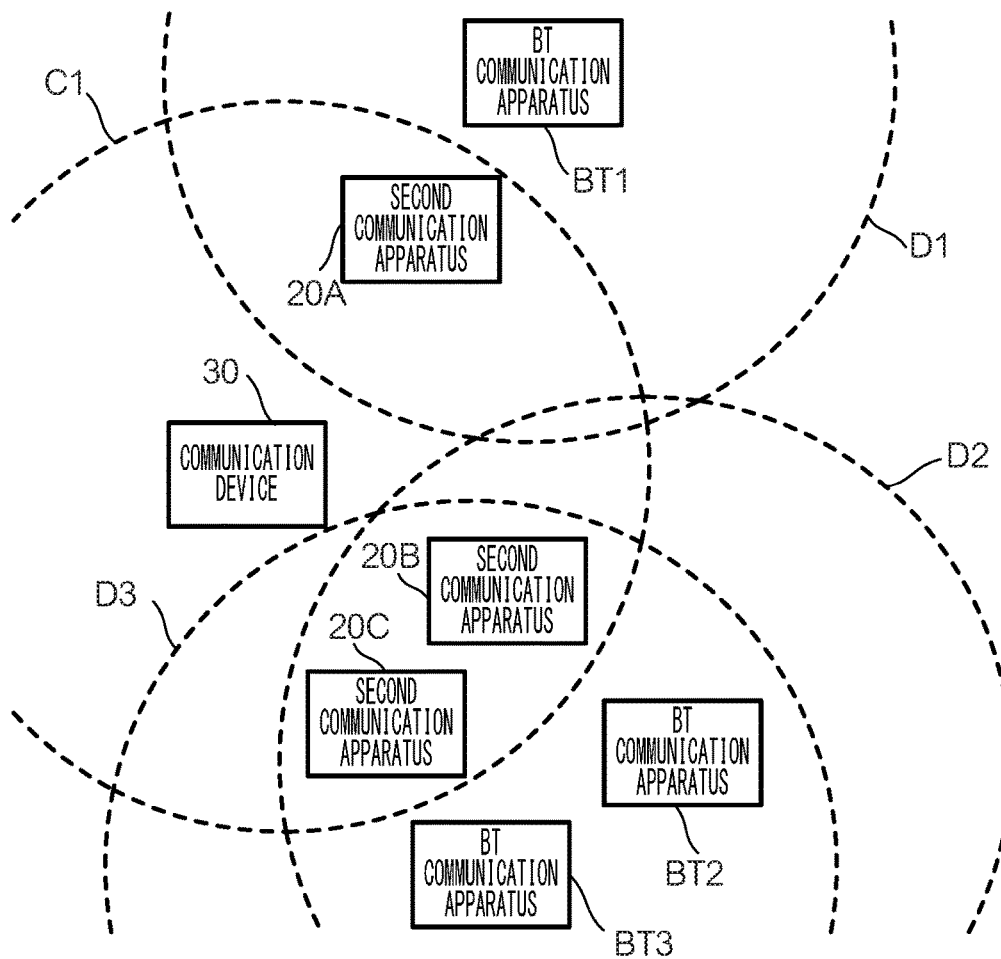
FIG. 14 illustrates the states of wireless communication.

FIG. 14 illustrates the states of wireless communication. In FIG. 14, three BT communication apparatuses "BT1" to "BT3" are situated around communication device 30. Second communication apparatuses 20A, 20B, and 20C shown in BT communication range C1 of communication device 30 denote the positions at which these second communication apparatuses were present when they received identification data of communication device 30 and performed position measurement. At these positions, second communication apparatus 20A can perform BT communication with BT1, whereas second communication apparatuses 20B and 20C can perform BT communication with BT2 and BT3. In this case, apparatus position data indicating the apparatus position of BT1 serves as the state data of second communication apparatus 20A, and apparatus position data indicating the apparatus positions of BT2 and BT3 serves as the state data of second communication apparatuses 20B and 20C.

Calculation means 404 of server apparatus 40c calculates one position on the basis of the positions indicated by the plurality of pieces of position data and the states of wireless communication indicated by the pieces of state data associated with the pieces of position data. For example, calculation means 404 determines the magnitudes of errors of the positions from the states of wireless communication, and calculates one position by obtaining a weighted average. Note that a larger weight is given to a position having a smaller error in obtaining the weighted average. This calculation method will now be described using the example of FIG. 14.

There is a high possibility that a distance between second communication apparatuses 20B and 20C that share a common state of wireless communication (this is referral to as a "common-state distance") is shorter than a distance between second communication apparatuses 20A and 20B that do not share a common state and a distance between second communication apparatuses 20A and 20C that do not share a common state (these are referral to as "non-common-state distances"). In view of this, for example, when the common-state distance of second communication apparatus 20B (a distance to 20C) is longer than the non-common-state distance thereof (a distance to 20A), calculation means 404 determines that the magnitude of error of the position measured by second communication apparatus 20B is large, and reduces a weight given to that position in obtaining a weighted average. For example, when the common-state distance of second communication apparatus 20C (a distance to 20B) is shorter than the non-common-state distance thereof (a distance to 20A), calculation means 404 determines that the magnitude of error of the position measured by second communication apparatus 20C is small, and increases a weight given to that position in obtaining a weighted average.

By calculating one position also on the basis of the states of wireless communication as described above, errors of the measured positions can be determined accurately compared to a case in which the states of wireless communication are not used. This can facilitate calculation of one position that is close to the actual position of communication device 30. Wireless communication whose state is indicated by state data may not be used in position measurement. In this case, it is sufficient for the measurement means of each of the first and second communication apparatuses to transmit state data indicating the state of wireless communication at the time when it measured the GPS position and position data indicating that position to server apparatus 40c in association with each other.

4-3. Calculation in Consideration of Receiving Capabilities in Wireless Communication When a position is measured using wireless communication as described above, the precision of the measured position is influenced by the receiving capabilities of the first and second communication apparatuses in wireless communication. A receiving capability denotes a capability to receive radio waves and extract data. The receiving capability is defined by, for example, a receiving sensitivity and a separation capability. A receiving sensitivity is an index indicating the intensity of receivable radio waves. A higher receiving sensitivity allows for reception of weaker radio waves. A separation capability is a capability to separate noise and signals of other wireless communications from received radio waves.

Figure 15:
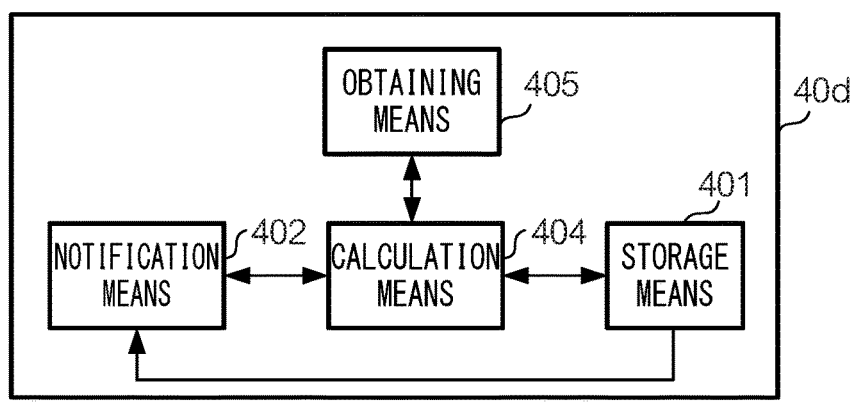
FIG. 15 shows another example of a functional configuration of a server apparatus according to the fourth embodiment.

FIG. 15 shows another example of a functional configuration of a server apparatus according to the fourth embodiment. FIG. 15 shows server apparatus 40d including obtaining means 405 in addition to the means shown in FIG. 13. In this example, a measurement means of a communication apparatus measures the position of the communication apparatus using wireless communication data received from a wireless communication apparatus with which wireless communication is performed. The wireless communication data is, for example, the aforementioned apparatus data. The communication apparatus denotes one or both of the first and second communication apparatuses. Hereinafter, a simple expression "communication apparatus" denotes such a communication apparatus.

Obtaining means 405 obtains specification data indicating the specifications of hardware of the communication apparatus related to wireless communication. The following describes a case in which obtaining means 405 obtains, as the specification data, data indicating a reception sensitivity included in a receiving capability described above in units of dB/m (decibel per meter) or the like. In this case, for example, a transmission means of the communication apparatus transmits the specification data of the communication apparatus when transmitting position data, and obtaining means 405 obtains the specification data.

For example, obtaining means 405 may store a specification table in which types and models of communication apparatuses are associated with pieces of specification data. In this case, when the communication apparatus transmits type data indicating the type and the model thereof, obtaining means 405 obtains specification data associated with a type and a model indicated by the received type data from the specification table. Alternatively, a specification table may be used in which pieces of specification data are associated with pieces of identification data instead of types and models. In this case, obtaining means 405 obtains specification data associated with identification data transmitted in association with position data from the specification table. Obtaining means 405 feeds the obtained specification data to calculation means 404.

Calculation means 404 calculates one position on the basis of the positions indicated by position data transmitted from a plurality of communication apparatuses, and the specifications indicated by specification data obtained with respect to the plurality of communication apparatuses. In this example, calculation means 404 determines that the magnitude of error of a position is small when a receiving sensitivity—the specifications indicated by obtained specification data—is high, and calculates one position by obtaining a weighted average using a larger weight for a position having smaller error. A communication apparatus with a higher receiving sensitivity can receive weaker radio waves. Therefore, for example, when a communication apparatus with a high receiving sensitivity and a communication apparatus with a low receiving sensitivity are present at the same position, the communication apparatus with the high receiving sensitivity can perform wireless communication with many wireless communication apparatuses, and its position is likely to have high precision. By thus calculating one position also on the basis of the specifications of hardware of communication apparatuses related to wireless communication, errors of the measured positions can be determined accurately compared to a case in which the specifications are not used. This can facilitate calculation of one position that is close to the actual position of communication device 30.

5. Modification Examples

The aforementioned embodiments are merely example embodiments of the present invention, and may be modified as follows. Furthermore, the aforementioned embodiments and the following modification examples may be implemented in combination as necessary.

5-1. Push Notification of Lost Details

In the embodiments, notification means 402 of a server apparatus performs so-called pull-type notification to give notice of lost details when a request is made by a first communication apparatus. Alternatively, it may perform so-called push-type notification to give notice of the lost details without the request from the first communication apparatus (hereinafter referred to as "push notification"). For example, notification means 402 may give notice of the lost details regularly (e.g., every day), or each time the lost details is updated due to transmission of position data from a second communication apparatus. In this way, the lost details can be provided to a user without the user performing an operation to request the lost details.

5-2. Mandatory Display of Push Notification

In the embodiments, display means 105 of a first communication apparatus displays lost details whenever data indicating the lost details is received from a server apparatus. However, when the aforementioned push notification is performed, the first communication apparatus may be set so as to prohibit display of the push notification. In the event of an emergency where communication device 30 is transported by a third person, it is preferable to notify a user without fail. The present modification example mandatorily causes the first communication apparatus to display the push notification under such a circumstance.

Figure 16:
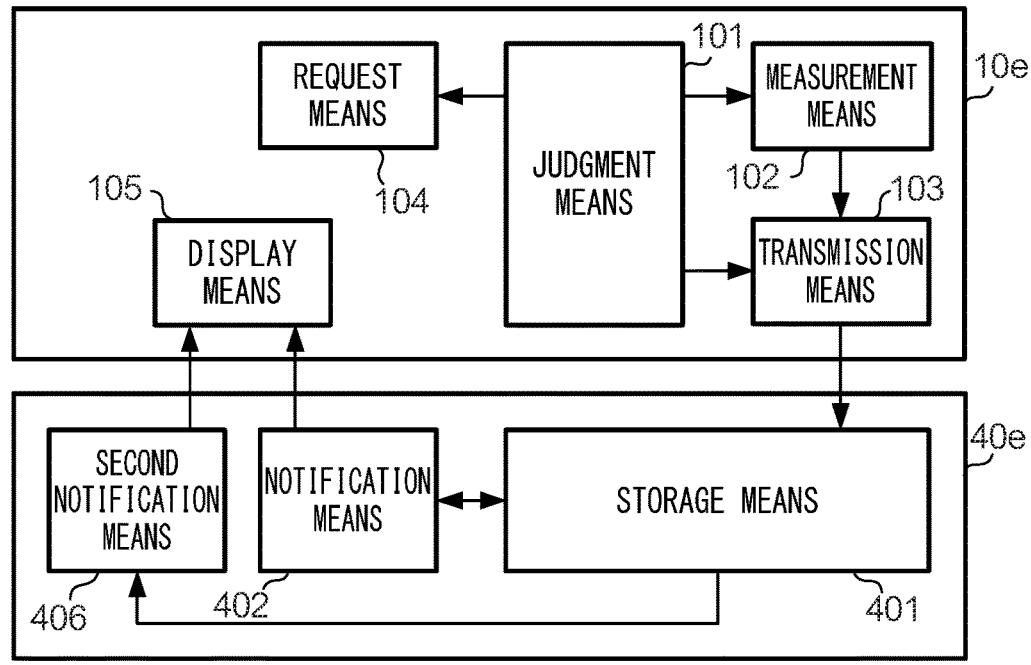
FIG. 16 shows an example of functional configurations of a server apparatus and a first communication apparatus according to a modification example.

FIG. 16 shows an example of functional configurations of a server apparatus and a first communication apparatus according to the present modification example. FIG. 16 shows first communication apparatus 10e including means similar to the means shown in FIG. 6, and server apparatus 40e including second notification means 406 in addition to the means shown in FIG. 6. In this example, notification means 402 of server apparatus 40e (an example of "first notification means" in the present invention) notifies the first communication apparatus that has transmitted identification data of the position(s) indicated by position data stored in storage means 401 in association with loss data when the loss data is stored. Notification means 402 performs this notification through the aforementioned push-type notification. Hereinafter, this notification is referral to as "first notification."

When a first position indicated by position data transmitted from the first communication apparatus and a second position indicated by position data transmitted from a second communication apparatus are distant from each other by at least a predetermined distance (e.g., 100 m or 500 m), second notification means 406 notifies the first communication apparatus to that effect. Hereinafter, this notification is referred to as "second notification." For example, each time position data and identification data associated with each other are received from the second communication apparatus, second notification means 406 obtains a distance between the position indicated by the received position data and the position indicated by position data transmitted from the first communication apparatus included among position data stored in storage means 401 in association with the identification data associated with the received position data. When the obtained distance is equal to or longer than the prestored predetermined distance, second notification means 406 generates notification data for performing the second notification, and transmits the notification data to the first communication apparatus.

When display means 105 of first communication apparatus 10e is set so as to prohibit display of any position from server apparatus 40e (hereinafter referred to as a "prohibition state"), it does not perform display unless server apparatus 40e performs the aforementioned second notification, that is, displays a position(s) from server apparatus 40e if the second notification is performed, even during the prohibition state. This allows for display of the positions related to communication device 30 as shown in FIG. 9B, for example. It will be assumed that, in the example of FIG. 9B, a distance between position B1 indicated by the position data transmitted from the first communication apparatus and position B2 indicated by the position data transmitted from the second communication apparatus is equal to or longer than the predetermined distance.

When the aforementioned second notification is performed, there is a high possibility that a third person has transported communication device 30 from the position where communication device 30 first gets lost. In the present modification example, even when the push notification is prohibited on the first communication apparatus, the push notification is mandatorily displayed if there is a high possibility of communication device 30 being transported by a third person. Accordingly, a user can be promptly informed to that effect.

5-3. Asking for Processing

When a first communication apparatus has determined that communication device 30 has been lost, a second communication apparatus that is present nearby may be asked to execute processing for collecting lost details on communication device 30.

Figure 17:
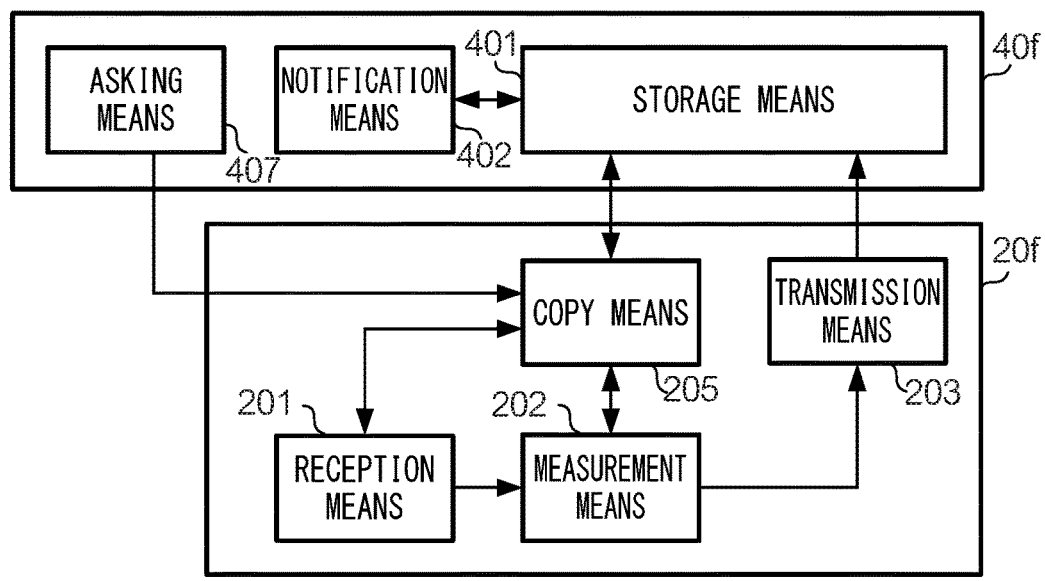
FIG. 17 shows an example of functional configurations of a server apparatus and a second communication apparatus according to a modification example.

FIG. 17 shows an example of functional configurations of a server apparatus and a second communication apparatus according to the present modification example. FIG. 17 shows second communication apparatus 20f including means similar to the means shown in FIG. 12, and server apparatus 40f including asking means 407 in addition to the means shown in FIG. 6. In this example, measurement means 202 of second communication apparatus 20f repeatedly measures the position of second communication apparatus 20f at, for example, a predetermined time interval (e.g., every minute), and each time measurement means 202 measures the position, transmission means 203 transmits position data indicating the measured position to server apparatus 40f.

Asking means 407 asks second communication apparatus 20f to execute processing for storing, to storage means 401 of server apparatus 40f, position data indicating the position of communication device 30 that has been determined to be is lost by the first communication apparatus (hereinafter referred to as "storage processing"). More specifically, asking means 407 asks second communication apparatus 20f that has transmitted position data indicating the position included in the same region as the position indicated by position data transmitted from the first communication apparatus to execute the storage processing. For example, asking means 407 transmits, to second communication apparatus 20f, asking data that asks for the storage processing for making a copy of identification data transmitted from the first communication apparatus in association with the position data and storing the copy.

Upon receiving the asking data, second communication apparatus 20f makes a copy of the identification data indicated by the asking data from storage means 401, and stores the copy. In this way, the identification data of communication device 30 is stored in second communication apparatus 20f that is present in the same region as the first communication apparatus that has determined that communication device 30 has been lost. Therefore, when second communication apparatus 20f receives the identification data sent from communication device 30, it performs position measurement and transmits position data. As described above, the present modification example makes it easy for the second communication apparatus that is present nearby communication device 30 is lost to measure the position of communication device 30, and makes it easy to provide lost details of communication device 30 to a user. As a result, the user can easily find communication device 30.

Asking means 407 may ask for display processing for displaying a message for informing the user of the fact that communication device 30 has been lost in addition to or in place of the storage processing. This allows a user of the second communication apparatus to recognize the fact that communication device 30 has been lost nearby, and increases the possibility of the user visually finding communication device 30. When the second communication apparatus can be set so as to prohibit position measurement by measurement means 202, asking means 407 may ask for display processing for displaying a message to set the second communication apparatus to enable position measurement. This can lower the likelihood of the occurrence of a situation in which the second communication apparatus does not perform position measurement upon receiving identification data. In addition, the second communication apparatus that performed position measurement may be asked to execute display processing for displaying a message indicating an appreciation for the measurement.

5-4. Personal Data

Storage means 401 of a server apparatus may store, for example, personal data of a user who owns communication device 30 in association with identification data of communication device 30. The personal data includes, for example, a name, a telephone number, an e-mail address, and a social networking service (SNS) account of the user. These pieces of personal information are registered together with the identification data of communication device 30, or registered later by a user operation. For example, asking means 407 described above may ask a second communication apparatus to display the personal data when asking the second communication apparatus to execute the storage processing. In this way, when a user of the second communication apparatus finds communication device 30 is lost, the user who has lost communication device 30 can easily be contacted to that effect.

5-5. Measurement Means

A measurement means of each of a first communication apparatus and a second communication apparatus may measure the position of the apparatus using a method other than the methods described above. For example, the measurement means may carry out known base station positioning that utilizes communication with mobile communication base stations, or may carry out positioning in accordance with a user operation. The user operation denotes, for example, an operation of inputting a name of a place, a name of a facility, and the like, or an operation of displaying a map and specifying a position on the map.

5-6. Judgment Means

Determination means 101 of a first communication apparatus may determine that communication device 30 has been lost using a method other than the methods described above. For example, determination means 101 determines that communication device 30 has been lost in accordance with a user operation. In this case, a user may perform an operation of inputting the approximate time at which communication device 30 is thought to be lost when he/she notices the lost state, and it may be regarded that communication device 30 is determined to be is lost at the input time. In this case, for example, measurement means 102 may measure a position at a predetermined time interval (e.g., every minute), and each measured position may be stored in association with the time of measurement. A position stored in association with the time input by the user may be used as the position of the first communication apparatus at the time when determination means 101 determined that communication device 30 was is lost. In this way, a position closer to the position at which the loss occurred is measured even if the user does not perform an operation of judging that communication device 30 has been lost immediately after the loss occurred.

The present technique is provided as an information processing system, a server apparatus, a first communication apparatus, a second communication apparatus, and a mobile terminal that have been described above. The present technique is also provided as an information processing method of realizing processing executed by these system and apparatuses/terminals.

In summary, it is sufficient for a server apparatus according to the present technique to include: a communication unit that communicates with a first communication apparatus and one or more second communication apparatuses; a registration unit that registers identification data of a mobile terminal in a lost state upon obtaining the identification data from the first communication apparatus; and an output unit that, upon obtaining position data and the identification data from one or more second communication apparatuses, outputs the position data when the identification data is registered, the position data indicating the positions of one or more second communication apparatuses at the time when one or more second communication apparatuses receive the identification data sent from the mobile terminal. The position data may be output to the first communication apparatus, one or more second communication apparatuses, a storage apparatus within the server, or another apparatus. The position data may be output when a request is received from an apparatus. The timing of the output may be determined by the server apparatus.

The present invention is also provided as programs for causing computers, such as the foregoing apparatuses/terminals, to function. These programs may be provided in a form of a recording medium, such as an optical disc, having the programs stored therein. These programs may be downloaded and installed in the computers via a network, such as the Internet, to be provided in a usable form.

REFERENCE SIGNS LIST 1 information processing system
10 first communication apparatus
20 second communication apparatus
30 communication device
40 server apparatus
11, 21, 31, 41 control unit
12, 22, 32, 42 storage unit
13, 23 first communication unit
33, 43 communication unit
14, 24 second communication unit
15, 25 position-measuring unit
16, 26 display unit
17, 27 input unit
101 determination means
102 measurement means
103 transmission means
104 request means
105 display means
201 reception means
202 measurement means
203 transmission means
204 inquiry means
205 copy means
301 sending means
401 storage means
402 transmission means
403 response means
404 calculation means
405 obtaining means
406 second notification means
407 asking means

What is claimed is:

1. A server apparatus, comprising:
a communication unit that communicates with a first communication apparatus and a second communication apparatus;
a storage unit that, upon obtaining identification data of a mobile terminal which has been lost from the first communication apparatus, stores the identification data and position data, indicating a position of the first communication apparatus at the time when the mobile terminal gets lost, in association with each other, wherein the storage unit, upon obtaining identification data of the mobile terminal which has been lost from the second communication apparatus, stores the obtained identification data and position data, indicating a position of the second communication apparatus at the time when the mobile terminal gets lost, in association with each other; and a notification unit that, in a situation where the first position indicated by position data obtained from the first communication apparatus and the second position indicated by position data received from the second communication apparatus are distant from each other by at least a predetermined distance, provides a notification to the first communication apparatus that is set to prohibit display of any position from server apparatus unless the server apparatus performs the notification.

2. The server apparatus according to claim 1, further comprising
a calculation unit that, when a plurality of pieces of position data are registered in association with the identification data, calculates one position on the basis of the plurality of pieces of position data.

3. The server apparatus according to claim 2, wherein
when pieces of state data indicating states of wireless communication at times of reception of the identification data are obtained from the second communication apparatus in association with pieces of position data through multiple transactions, the calculation unit calculates the one position on the basis of positions indicated by the pieces of position data and the states of wireless communication indicated by the associated pieces of state data.

4. The server apparatus according to claim 2, further comprising
an obtaining unit that obtains specification data indicating specifications of hardware related to wireless communication when at least one of the first communication apparatus and the second communication apparatus performs position measurement via the wireless communication, wherein
the calculation unit calculates the one position on the basis of the specifications indicated by the specification data.

5. The server apparatus according to claim 1, further comprising
an asking unit that, when the second communication apparatus belongs to the same region as the first communication apparatus, notifies the second communication apparatus of the identification data, and asks the second communication apparatus to transmit the identification data and position data of the second communication apparatus to the server apparatus upon reception of the identification data by the second communication apparatus.

6. An information processing system, comprising:
a server apparatus; and
a first communication apparatus,
wherein the server apparatus includes:
a communication unit that communicates with the first communication apparatus and a second communication apparatus;
a storage unit that, upon obtaining identification data of a mobile terminal which has been lost from the first communication apparatus, stores the obtained identification data and position data, indicating a position of the first communication apparatus at the time when the mobile terminal gets lost, in association with each other, wherein the storage unit, upon obtaining identification data of the mobile terminal which has been lost from the second communication apparatus, stores the obtained identification data and position data, indicating a position of the second communication apparatus at the time when the mobile terminal gets lost, in association with each other;

and a notification unit that, in a situation where the first position indicated by position data obtained from the first communication apparatus and the second position indicated by position data received from the second communication apparatus are distant from each other by at least a predetermined distance, provides a notification to the first communication apparatus; and the first communication apparatus includes:
  a measurement unit that measures a position of the first communication apparatus;
  a determination unit that determines whether the mobile terminal is lost;
  a transmission unit that, when the mobile terminal is lost, transmits the identification data and the position of the first communication apparatus to the server apparatus in association with each other;

and
  a display unit that is set to prohibit display of any position from server apparatus unless the server apparatus performs the notification.

7. An information processing system, comprising:
a server apparatus; and
a second communication apparatus, wherein
the server apparatus includes:
  a communication unit that communicates with a first communication apparatus and the second communication apparatus;
  a storage unit that, upon obtaining identification data of a mobile terminal which has been lost from the first communication apparatus, stores the obtained identification data and position data, indicating a position of the first communication apparatus at the time when the mobile terminal gets lost, in association with each other, wherein the storage unit, upon obtaining identification data of the mobile terminal which has been lost from the second communication apparatus, stores the obtained identification data and position data, indicating a position of the second communication apparatus at the time when the mobile terminal gets lost, in association with each other;
  a response unit that makes a response to the second communication apparatus with respect to an inquiry request from the second communication apparatus, the response indicating whether the identification data is registered in the server apparatus; and
  a notification unit that, in a situation where the first position indicated by position data obtained from the first communication apparatus and the second position indicated by position data received from the second communication apparatus are distant from each other by at least a predetermined distance, provides a notification to the first communication apparatus that is set to prohibit display of any position from server apparatus unless the server apparatus performs the notification; and the second communication apparatus includes:
  a reception unit that receives the identification data sent from the mobile terminal;
  an inquiry unit that makes an inquiry to the server apparatus about the received identification data;
  a measurement unit that measures a position of the second communication apparatus; and
  a transmission unit that, when a response indicating that the identification data is registered is received from the server apparatus, transmits the position of the second communication apparatus at a time of reception of the identification data to the server apparatus in association with the identification data.

8. An information processing system, comprising:
a server apparatus; and
a second communication apparatus, wherein
the server apparatus includes:
  a communication unit that communicates with a first communication apparatus and the second communication apparatus;
  a storage unit that, upon obtaining identification data of a mobile terminal which has been lost from the first communication apparatus, stores the obtained identification data and position data, indicating a position of the first communication apparatus at the time when the mobile terminal gets lost, in association with each other, wherein the storage unit, upon obtaining identification data of the mobile terminal which has been lost from the second communication apparatus, stores the obtained identification data and position data, indicating a position of the second communication apparatus at the time when the mobile terminal gets lost, in association with each other;
  a response unit that makes a response to the second communication apparatus with respect to an inquiry request from the second communication apparatus, the response indicating whether the identification data is registered in the server apparatus; and
  a notification unit that, in a situation where the first position indicated by position data obtained from the first communication apparatus and the second position indicated by position data received from the second communication apparatus are distant from each other by at least a predetermined distance, provides a notification to the first communication apparatus that is set to prohibit display of any position from server apparatus unless the server apparatus performs the notification; and the second communication apparatus includes:
  a storage unit that stores the identification data obtained from the server apparatus;
  a measurement unit that measures a position of the second communication apparatus;
  an obtaining unit that obtains the identification data from the mobile terminal; and
  a transmission unit that, when the obtained identification data is stored in the storage unit, transmits the position of the second communication apparatus at a time of reception of the identification data to the server apparatus in association with the identification data.

9. The information processing system according to claim 8, wherein
when a position indicated by position data associated with the identification data obtained from the server apparatus belongs to the same region as the measured position of the second communication apparatus, the storage unit stores the identification data.

* * * * *